Sept. 15, 1959   J. P. HADJILIAS   2,903,940
SIGHTING INSTRUMENT
Filed March 16, 1954   2 Sheets-Sheet 1
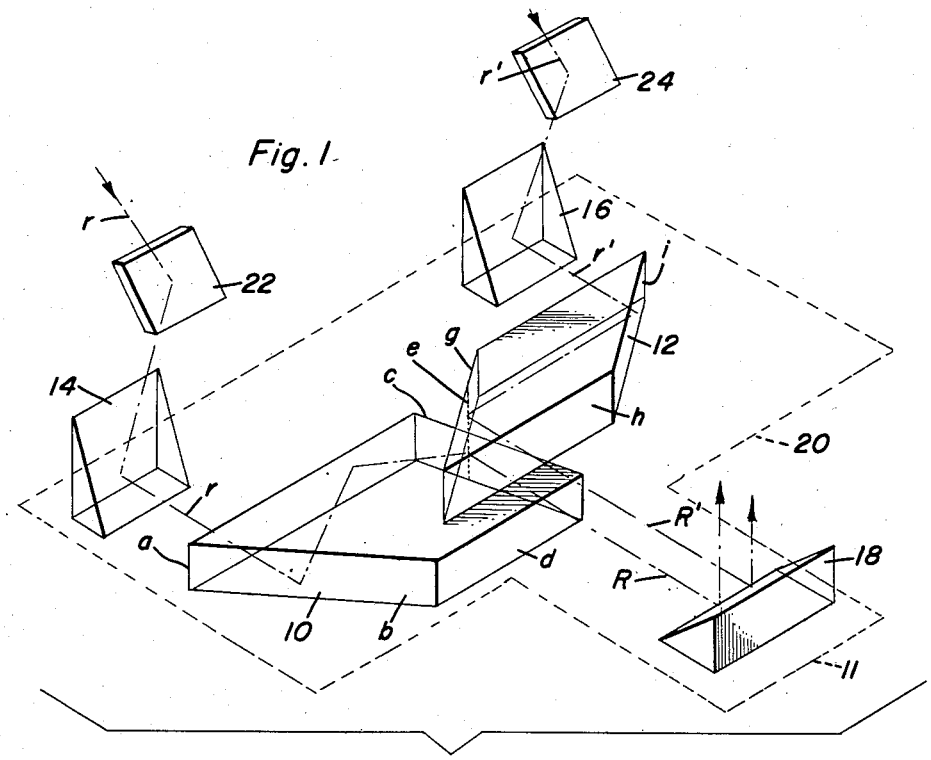
Fig. 1
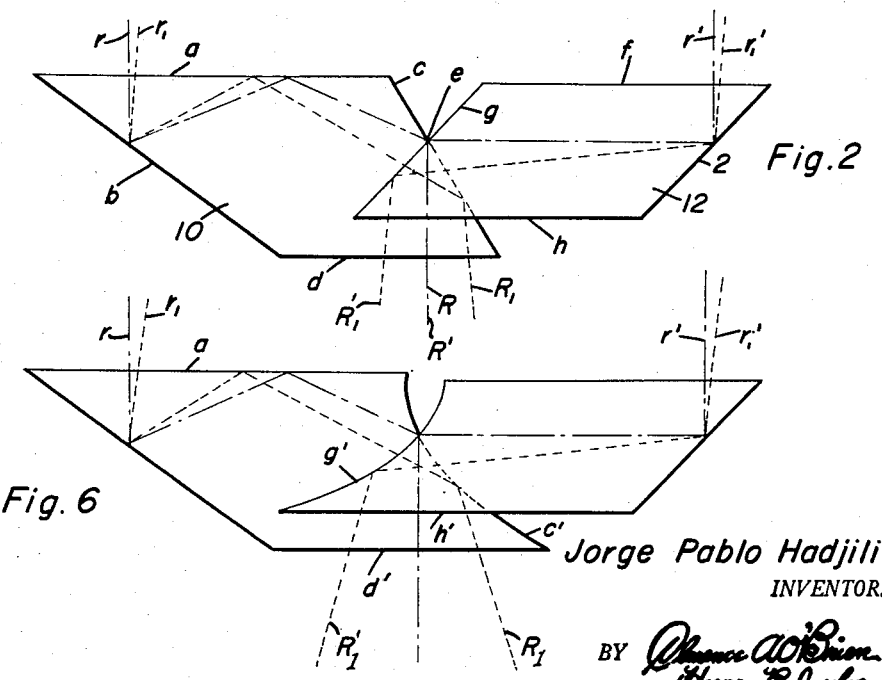
Fig. 2
Fig. 6
Jorge Pablo Hadjilias
INVENTOR.
BY *[signatures]*
Attorneys Sept. 15, 1959     J. P. HADJILIAS     2,903,940
SIGHTING INSTRUMENT
Filed March 16, 1954     2 Sheets-Sheet 2
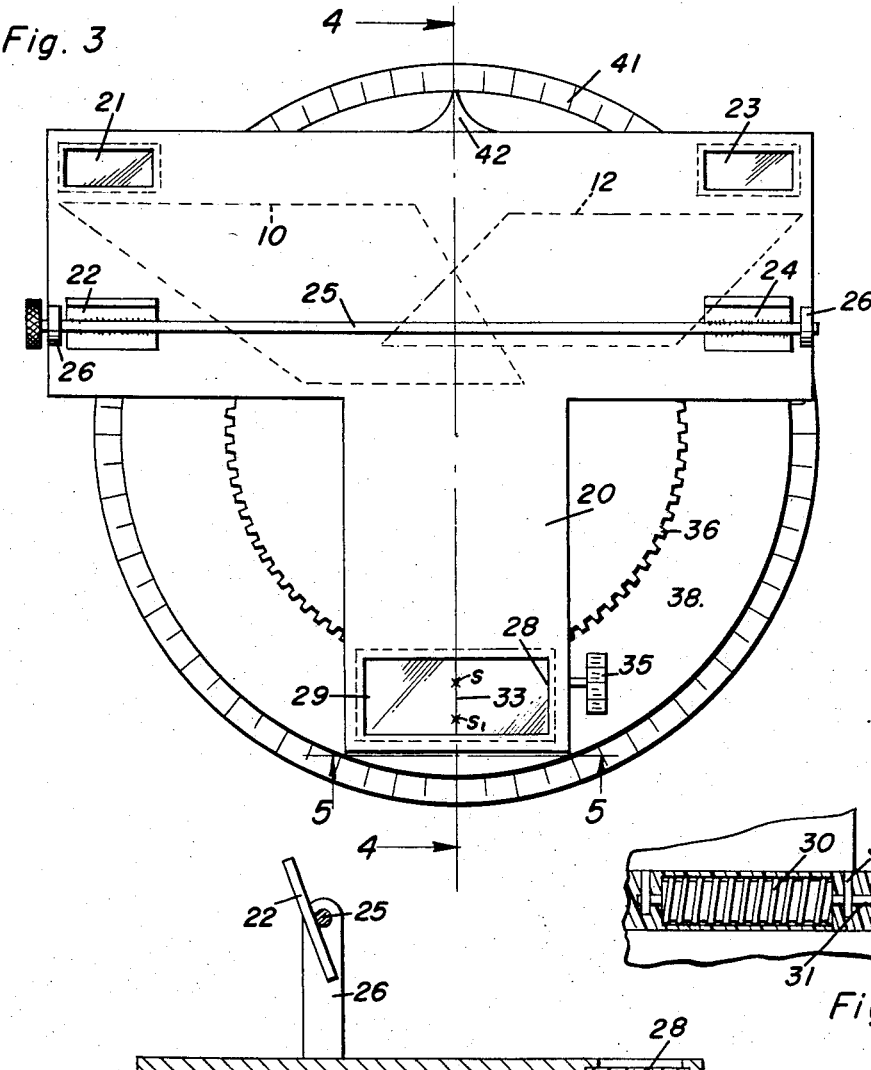
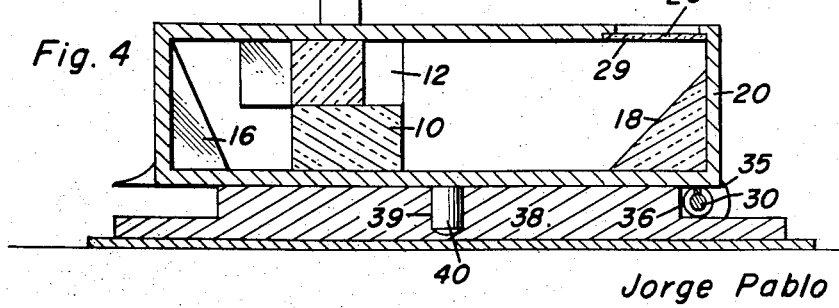
Jorge Pablo Hadjilias
INVENTOR.

United States Patent Office 2,903,940
Patented Sept. 15, 1959

2,903,940

SIGHTING INSTRUMENT

Jorge Pablo Hadjilias, Athens, Greece

Application March 16, 1954, Serial No. 416,624

6 Claims. (Cl. 88—2.6)

This invention relates to navigational and geodetical instruments and more particularly to that class of instruments used in conjunction with compasses either of the gyroscopic or of the magnetic type in order to determine the true azimuth of heavenly or terrestrial objects.

The main object of the invention consists in providing a sighting instrument of very high accuracy which, by virtue of its simplicity and its accuracy, especially when in association with a mariner's, navigator's or surveyor's compass, permits to obtain measurements which may replace those obtainable by most other navigational or geodetical instruments.

Essentially the invention consists in a sighting instrument, determining the azimuth position of celestial or terrestrial objects by means of two images of said objects obtained by light rays following different and independent paths through prisms with reflecting surfaces which produce two images brought into alignment along a given predetermined line only in one position of the instrument which is characteristic of a definite relative position of the sighting means and the object which has been sighted, this sighting position thus being directly related to the azimuth position of the said object.

Further the invention consists in so arranging the sighting means and the light ray paths that the sighting means are independent of movements performed by the instrument or by the observer or by the craft carrying both.

An object of the invention therefore consists in providing an instrument the optical arrangement of which is based on co-indication by two independently formed images, the relative position of which changes with the change of position of the sighting means of the instrument, a predetermined co-indication, for instance a complete alignment of the images in superposition along a single line being used for accurately indicating the position of the sighting means of the instrument relatively to a fixed or movable reference surface.

It is also an object of the invention to produce the above mentioned co-indication by means of a prism assembly, having two prisms, some faces of which are reflecting for rays which have entered the prisms, and to so arrange said prisms relatively to each other that their ray entrance and exit surfaces are parallel, while reflecting surfaces in the two prisms have one line in common, the two images of an object in one position of the prism assembly being reflected from points along said common line and being thus co-indicant of a position in which the ray entrance surfaces of the prisms are perpendicular to the rays emanating from the object.

A further object of the invention consists in providing an instrument eliminating all corrections to be applied such as the corrections due to the height of the eye and corrections due to refraction etc.

A further object of the invention consists in so directing and reflecting the rays entering and leaving the prisms that the indication is independent of the spatial position or the spatial movement of the instrument.

Further objects of the invention are more specific and will best be explained in connection with the detailed description of the instrument and in the annexed claims.

The invention is illustrated in the accompanying drawings showing one embodiment of the invention and in addition a modification of one of its elements. It is however to be understood that the embodiment of the invention which is shown in the drawings illustrates the invention only by way of example and that this illustration is therefore not to be considered as limitative. Obviously, the principle illustrated diagrammatically can be applied to instruments other than that shown in some of the figures and it will therefore be clear that a departure from the embodiment which has been illustrated is not necessarily a departure from the principle of the invention.

In the drawings:

Figure 1 is a perspective diagram illustrating the optical means used in connection with this invention and their cooperation and also illustrating the paths of the ray beams.

Figure 2 is a plan view of the prisms and also illustrates the paths of the light rays when passing through the prisms.

Figure 3 is a plan view of the instrument when used in connection with a reference surface which may for instance be a gyroscopic repeater chart or disk or a magnetic repeater chart or disk.

Figure 4 is an elevational sectional view of the instrument shown in Figure 3 the section being taken along line 4—4 of Figure 3.

Figure 5 illustrates a detail in an elevational view, the view being taken along line 5—5 of Figure 3.

Figure 6 is a plan view on prisms which have been provided with curved inner reflecting surfaces.

The optical principles which are used, especially the optical principles used in connection with an instrument in determining the azimuth will be best explained referring to Figures 1 and 2 of the drawings.

The instrument according to the invention essentially comprises an optical system based on a prism assembly with two superposed quadrangular prisms 10, 12. The bases $m$, $p$, $n$, $q$ which may be either of rhomboidal or trapezoidal shape. The bases $m$, $n$, $p$, $q$ of the prisms are all parallel. The optically active surfaces are the side faces $a$, $b$, $c$ and $f$, $g$, $i$ which are so inclined with respect to each other that light rays entering into the prisms are reflected either by total reflection or by silvering or otherwise preparing the optically active surface of the prisms that these light rays issue through one of the faces of the prisms facing the observation means. Either total reflection or reflection on a metallic layer may be used to produce the desired path of the light rays within the prisms.

The bases $m$, $n$, of the prism 10, for instance are of trapezoidal shape. Through side face $a$ of the prism 10 the rays from the object, serving as a reference point for the determination of the position, enter the prism substantially at right angles to the said side face. This surface $a$ which is turned towards the object is joined to the two other side faces $b$, $c$ which may both be reflecting surfaces and which are metallized, if the angle at which the light rays strike the surface is below the value for total reflection. Likewise part of the side face $a$ (indicated at $a'$) may be metallized, if the angle at which the rays strike the surface after reflection in the interior of the prism are below the value of the angle of incidence producing total reflection. The entering light ray $r$ is therefore reflected from the surface $b$ and after reflection at the surface $a$ reaches the surface $c$ on its way through the prism. From this surface the ray $R$ is reflected towards the surface $d$ and passes out of the prism.

As illustrated prism 12 may be rhomboidal and in this case the incoming ray $r_1$ enters the prism through side face $f$ and is reflected from the side face $i$ which may be preferably metalized directly towards the opposite reflecting surface $g$ and from there passes out of the prism through the surface $h$.

Preferably the entrance and exit surfaces $a$ and $d$ and $f$, $h$ respectively of both prisms 10 or 12 are parallel.

The two prisms 10 and 12 are superposed with their inner portions overlapping. The (optically inactive) top and bottom faces $m$, $n$, $p$, $q$ for most instruments are located in horizontal planes. On account of the overlapping of the inner portions of the two prisms the two reflecting side faces $c$, $g$ cross each other and as these surfaces are all parallel to two surfaces $c$ and $g$ have one line $e$ in common.

In the most simple form the two ray entrance side faces $a$ and $f$ of the two prisms are either parallel or located in the same plane.

The prism assembly consisting of the prisms 10, 12 is fixedly mounted within a movable casing described below and indicated in dotted lines at 11 in Figure 1. The prism assembly therefore always moves as a unit.

Before entering one of the prisms 10, 12 and after leaving the prisms the light rays are reflected from triangular reflecting prisms 14, 16 and 18 respectively, so arranged that the rays coming from the outside are reflected substantially in a plane parallel to the top and bottom surface of the prisms 10, 12.

To obtain such a reflection it is usually necessary to direct the rays of the object towards the triangular reflecting prisms 14 and 16 by means of further reflecting means such as the mirrows 22, 24 which are preferably adjustable.

In the diagrammatic Figure 1 it is assumed that the prism assembly is so arranged that top and bottom surfaces of the prisms 10, 12 are essentially located in horizontal planes and it is further assumed that the mirrors 22 and 24 are so adjusted that a ray emanating from an outside object is reflected first by one of the mirrows 22, 24 towards one of the triangular reflecting prisms 14, 16 and that it then follows the path indicated in Figures 1 and 2 by dashes and dots. The entrant ray $r$, if the side face $a$ is turned towards the object, enters exactly at right-angles to this side face, hits the reflecting surface $b$ and is reflected back on the inside of the prism towards the surface $a$, and is reflected, for instance by total reflection, at the inner face $a$, and reaches the reflecting surface $c$ from where it is again reflected towards the triangular prism 18, the exit ray being indicated at R.

Similarly, a ray emanating from the object is reflected from mirror 24 towards the reflecting prism 16 and this ray $r'$ then enters the prism 12 through side face $f$ and is reflected at the inner side face $i$ towards the opposite side face $g$ which in its turn reflects the ray towards the reflecting triangular prism 18, the exit ray being indicated at R'. The triangular reflecting prism 18 thus reflects both rays R and R' towards the observer.

From Figure 1 it will be clearly seen that the two reflected exit rays R and R', after leaving the surfaces $c$ and $g$, are both located in a single (vertical) plane when the side faces $a$ and $f$ are at right angles to the incident rays $r$ and $r'$. If these side faces $a$ and $f$ should however not be at right angles to the incoming rays $r$ and $r'$, the exit rays R and R' are no longer in one and the same vertical plane. While in the first named case the observer will see two aligned images of the object, these two images will no longer be aligned when the rays $r$ and $r'$ do not enter at right angles to the surfaces $a$ and $f$. If on a window pane through which the triangular prism 18 is viewed or on the triangular prism itself, this (vertical) plane is marked by a hairline, it will be clear that the correct position of the two prisms 10, 12 relative to the object will be observed with great accuracy.

This will especially be clear when the path of the incoming rays $r_1$ and $r_1'$ is considered in the event that these rays are not at right angles to the surfaces $a$ and $f$. The path of the rays in this case is indicated in dotted lines in Figure 2, and it is seen in this case the exit rays $R_1$ and $R_1'$ become divergent and the two images of the object will no longer be located on the hairline marking the intersection of the vertical plane with the reflecting prism 18 or the windowpane through which the prism is observed and are located on both sides of the line.

To obtain great accuracy the divergence of the two rays $R_1$, $R_1'$ may be increased by using curved reflecting surfaces $c'$ and $g'$, the radius of curvature of which increases with decreasing distance from the ray exit surface $d'$ and $h'$. Curved surfaces of this type permit therefore a very high accuracy in determining any deviation of the incoming rays $r$, $r'$ from the correct position at right angles to these entrance surfaces.

The above explained principle of determining with high accuracy the position of an observer or of a celestial or terrestrial object by the exact orientation of a prism assembly is carried into effect by mounting the prism assembly, consisting of the two quadrangular prisms 10, 12 together with the two reflecting or auxiliary prisms 14, 16 and the observer's reflecting prism 18, within a casing 20 which is rotatable around an axis. On this casing also posts or standards 26 may be mounted which carry an axle 25 on which the mirrors 22 and 24 are mounted. A knurled knob permits to turn the axle 25 either directly or (not shown) by means of an intermediate gear, so that the mirrows may be finely adjusted.

The casing 20 has suitable windows or openings 21, 23 which may or may not be covered with glass panes. The windows are provided above the auxiliary triangular reflecting prisms 14 and 16 and permit the passage of rays reflected by the mirrows 22 and 24. An observer opening 28, preferably covered with a glass pane 29 is arranged above the observation prism 18. This pane is preferably provided with a hairline 33 marking the intersection with a vertical plane within which the two images S, $S_1$ are aligned when the prism is correctly orientated towards the object.

The casing 20 is made of any suitable material and carries a worm wheel 30, rotatable around an axle 31 which is held within lugs 32 projecting from the casing 20. This axle carries a knob 35 with a cylindrical surface which may be provided with a graduation, cooperating with a marker (not shown) indicating the angle through which the knob has been rotated.

The worm 30 meshes with a worm wheel 36 which is either attached to or forms part of a disk or plate 38. The latter may be fixed if the instrument happens to be used on a fixed spot, but in most cases the disk plate 38 forms part of or is supported by a compass repeater chart and driven by a gyroscopic or magnetic compass. The casing 20 is freely rotatable on said plate member 38 and is merely held within a central bore 39 of the plate member by means of a pin or trunnion 40.

At the margin the member 38 or the chart with which it is connected is provided with a graduation 41 over which a pointer 42 attached to the casing 20 travels. By means of this graduation the relative position of the casing and of the compass chart or repeater chart may be accurately determined.

When in use, the operator orientates the instrument in general and turns it towards the object the position of which is to be determined and he then adjusts to mirrors 22, 24 so that the images of the object appear within the window 28. The operator then rotates the casing by means of the knob 35 to such an extent that the casing and the prism assembly are at right angles to the line connecting the object and the observer. This operation is continued until the two images S, $S_1$ of the object appear both on the hairline 33 in the window pane 29. When complete alignment of these two images has been obtained the operator may now read the position in degrees (or possibly in larger fractions of a degree) on the graduation 41 which preferably shows 360° and some fractions such as half degrees. The smaller fractions of a degree may be read on knob 35. If the knob is so graduated that it has sixty divisions, rotation of the knob through one division of the graduation would give the number of first minutes if the graduation 41 shows degrees. Still smaller fractions may be read if the instrument is suitably calibrated.

The instrument is of great precision and permits reading with an accuracy which has not been achieved before, as neither minutes nor fractions thereof can be read as a rule on a simple sighting instrument indicating the azimuth. It will be noted that the instrument needs no corrections and that rolling or pitching of the ship or plane will only influence the ultimate reading if the object is very close a case which rarely, if ever, occurs. The double reflection of the images first through the mirrors then through the first auxiliary prisms 14 and 16 and finally through the reflecting observing prism 18 will eliminate the effect of such movements on readings relating to more distant objects, just as a sextant does. When used together with a compass or compass repeater, the instrument therefore indicates the azimuth with great precision and it may replace a sextant in many observations. It will also be clear that correction for parallax, for height of the eye or for abnormal refraction and all similar corrections become unnecessary and likewise it is unnecessary to use a reference horizon or the like in connection with the instrument.

Further, the turning of the axle of the mirrors 22, 24 which may be performed through a gear by means of a graduated knob permits to determine the altitude (for instance for weather balloon observation etc.) of the object in addition to the azimuth determination.

It will be clear that a number of changes of a constructive nature may be made without in any way departing from the essence of the invention as defined in the annexed claims.

What is claimed as new is as follows:

1. An optical instrument for determining the azimuth of terrestrial or celestial objects comprising a prism assembly with two optical prisms, each adapted to reflect rays inwardly, said inward reflection occurring in each prism in one plane which is spaced from and parallel to the corresponding plane in the other prism, said prisms having parallel ray entrance surfaces, but having inwardly reflecting surfaces differently arranged in the two prisms so that the number of reflections in one prism differs from that obtained in the other prism by an odd number, one of the inwardly reflecting surfaces of one prism crossing an inwardly reflecting surface of the other prism, the two crossing surfaces having a line in common, an indicator with an indicator line located in a plane passing through the said common line of the crossing surfaces, exit surfaces on said prisms through which the rays leave, the rays reflected from points of said common line of the crossing prism surfaces being directed towards said indicator line along which spaced images of the object, sighted through the two prisms, appear, images of the same point of the object being aligned along the indicator line when the ray entrance surfaces of the prisms are exactly at right angles to the line of sight, connecting the observer with the object, and means for determining the angular position of the prism assembly relatively to a reference system.

2. An optical instrument for determining the azimuth of a terrestrial or celestial object comprising a rotatable prism assembly with two polygonal prisms with horizontal parallel top and bottom surfaces, said prisms being spaced vertically, some of the side surfaces of the polygonal prisms being inwardly reflecting surfaces and one side surface in each prism being a ray entrance surface and another being a ray exit surface, respectively, the ray entrance surfaces of the two prisms and the ray exit surfaces of the same being respectively parallel, the shape of the two polygonal prisms differing from each other so that the number of inwardly directed reflections in the two prisms differ by an odd number, one side face of one prism crossing a side face of the other prism so that the two side faces have a line in common, an indicator with an indicator line in the path of the rays emanating from the exit surfaces of the prisms, said indicator line being arranged in a plane passing through the common line of the crossing surfaces of the two prisms, the parallel ray entrance surfaces of the prisms being exactly at right angles to the line of sight connecting the object and the observer when rays from the same point of the object are directed within the prisms towards the common line of the crossing side surfaces and the images of the same object point appear aligned along the line of the indicator, and means for determining the exact angular position of the rotatable prism assembly relatively to a reference system.

3. An optical instrument as claimed in claim 2 wherein the inwardly reflecting surfaces of the prisms which cross each other and have a line in common are surfaces with a curvature increasing the divergence between rays reflected by the two prisms with increasing distance of the point of reflection from said common line.

4. An optical instrument as claimed in claim 2 wherein the ray entrance surface of one of the prisms is disposed at such an angle to one of the inwardly reflecting prism surfaces that said ray when entering is deflected toward said ray entrance surface and thereafter is reflected inwardly by it towards one of the reflecting surfaces crossing the corresponding surface of the other prism while in the other prism the entering ray is directly reflected towards said crossing surface by a reflecting surface without additional reflection, the number of reflections within the prisms thus differing from each other.

5. An optical instrument as claimed in claim 4 wherein the surface reflecting the ray toward the ray entrance surface and the latter are arranged at such an angle with respect to each other that the reflected ray strikes the ray entrance surface at an angle producing total reflection of the ray from the ray entrance surface.

6. An optical instrument as claimed in claim 2 wherein one prism of the prism assembly is of rhomboidal shape having substantially parallel entrance and ray exit side faces and substantially parallel inwardly reflecting surfaces, respectively, while the other prism is of trapezoidal shape with parallel ray entrance and ray exit surfaces, but with inwardly reflecting surfaces arranged at different angles relatively to the said entrance and exit surfaces, the reflecting surface facing the ray entrance surface being arranged at a more acute angle relatively to the said ray entrance side face than the second inwardly reflecting surface, the angle between the first reflecting surface and the ray entrance surface being sufficiently acute to produce a reflection of rays entering the prism towards the inner surface of the ray entrance side face at an angle producing total reflection, while in the rhomboidal prism the angle between the reflecting surface and the ray entrance surface is of such magnitude that an entering ray is directly reflected towards the other parallel inwardly reflecting surface, the number of reflections within the prisms of the assembly being thus rendered unequal.

References Cited in the file of this patent

UNITED STATES PATENTS

| | | |
|---|---|---|
| 240,705 | Hellberg | Apr. 26, 1881 |
| 889,625 | Konig et al. | June 2, 1908 |
| 1,208,120 | Fiske | Dec. 12, 1916 |
| 1,966,850 | Colt | July 17, 1934 |
| 2,055,684 | Eppenstein | Sept. 29, 1936 |
| 2,303,207 | Gehrke | Nov. 24, 1942 |